(12) United States Patent
Wang et al.

(10) Patent No.: US 9,160,239 B2
(45) Date of Patent: Oct. 13, 2015

(54) FLYBACK SWITCHING POWER SUPPLY CIRCUIT AND BACKLIGHT DRIVING DEVICE USING THE SAME

(71) Applicant: SHENZHEN CHINA STAR OPTOELECTRONICS TECHNOLOGY CO., LTD., Shenzhen, Guangdong (CN)

(72) Inventors: Zhao Wang, Shenzhen (CN); Dan Cao, Shenzhen (CN)

(73) Assignee: SHENZHEN CHINA STAR OPTOELECTRONICS TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 14/241,415

(22) PCT Filed: Jan. 17, 2014

(86) PCT No.: PCT/CN2014/070840
§ 371 (c)(1),
(2) Date: Feb. 26, 2014

(87) PCT Pub. No.: WO2015/081627
PCT Pub. Date: Jun. 11, 2015

(65) Prior Publication Data
US 2015/0162839 A1    Jun. 11, 2015

(30) Foreign Application Priority Data
Dec. 6, 2013    (CN) .......................... 2013 1 0656759

(51) Int. Cl.
*H02M 3/335* (2006.01)
*H05B 33/08* (2006.01)

(52) U.S. Cl.
CPC ....... *H02M 3/33507* (2013.01); *H05B 33/0815* (2013.01)

(58) Field of Classification Search
CPC ........... H05B 33/0815; H05B 33/0818; H05B 37/029; H05B 37/02; H05B 41/3925; H05B 41/391; H05B 41/2828; H05B 33/0803
USPC .......................... 315/291, 294, 224, 254, 232
See application file for complete search history.

(56) References Cited

U.S. PATENT DOCUMENTS 5,377,091 A * 12/1994 Faulk .......................... 363/21.16
5,455,757 A * 10/1995 Nguyen et al. ............. 363/21.16

(Continued)

*Primary Examiner* — Jimmy Vu
*Assistant Examiner* — Syed M Kaiser
(74) *Attorney, Agent, or Firm* — Stein IP, LLC

(57) ABSTRACT

The present invention provides a flyback switching power supply circuit and a backlight driving device using the same, the circuit includes: a transformer, including a primary winding, a secondary winding and an auxiliary winding arranged on one side of the primary winding; an output rectifier, connected to the output end of the flyback switching power supply circuit from the secondary winding of the transformer; a switching transistor, configured to control the voltage on the primary winding; a controller, configured to provide a pulse width modulation signal for driving the gate of the switching transistor; and a clamping delay circuit, configured to clamp the potential of the gate of the switching transistor to a low potential, so that the switching transistor is turned on at the wave trough of drain potential damped vibration. In the present invention, the MOS transistor may be turned on at the wave trough of potential damped vibration of the drain thereof and the switching loss of the MOS transistor thereby may be reduced by arranging the clamping delay circuit in the flyback switching power supply circuit and adding the auxiliary winding into the transformer.

16 Claims, 2 Drawing Sheets

(56) References Cited

U.S. PATENT DOCUMENTS

| | | | |
|---|---|---|---|
| 2006/0109691 A1* | 5/2006 | Strijker et al. | 363/1 |
| 2009/0141520 A1* | 6/2009 | Grande et al. | 363/21.16 |
| 2009/0295776 A1* | 12/2009 | Yu et al. | 345/212 |
| 2010/0295470 A1* | 11/2010 | Koutensky | 315/294 |
| 2010/0315838 A1* | 12/2010 | Mao et al. | 363/16 |
| 2012/0146986 A1* | 6/2012 | Ouchi et al. | 345/212 |
| 2012/0188801 A1* | 7/2012 | Lee et al. | 363/21.13 |
| 2012/0262080 A1* | 10/2012 | Watanabe et al. | 315/210 |
| 2012/0293087 A1* | 11/2012 | Matsuda et al. | 315/219 |
| 2012/0314456 A1* | 12/2012 | Lanni | 363/21.02 |
| 2013/0121049 A1* | 5/2013 | Shi et al. | 363/89 |
| 2014/0029316 A1* | 1/2014 | Adragna | 363/21.18 |
| 2014/0160801 A1* | 6/2014 | Stamm | 363/21.01 |
| 2014/0218978 A1* | 8/2014 | Heuken et al. | 363/21.16 |
| 2014/0268923 A1* | 9/2014 | Valley | 363/21.17 |

\* cited by examiner

FLYBACK SWITCHING POWER SUPPLY CIRCUIT AND BACKLIGHT DRIVING DEVICE USING THE SAME

FIELD OF THE INVENTION

The present disclosure relates to the technical field of power supply, and particularly, to a flyback switching power supply circuit and a backlight driving device using the same.

BACKGROUND OF THE INVENTION

In recent years, with rapid development of power supply technology, a switching mode stabilized power supply is trending towards miniaturization, high frequency and integration, and the high-efficiency switching power supply has been widely applied. A flyback-mode power supply circuit is one of the low-power switching power supply particularly suitable for, such as, household appliances, battery chargers and many other designs, due to its a number of advantages, e.g., simplicity of circuit, capability of efficiently providing direct-current output and the like.

A flyback switching power supply refers to a switching power supply with a flyback high-frequency transformer isolating input and output circuits. The term "flyback" specifically refers to that inductors connected in series in an output circuit are in a discharging state when the input is in high level (a switching diode is turned on) and are in a charging state when the input is low (the switching diode is turned off). FIG. 1 shows a schematic diagram of a flyback switching power supply circuit used in a liquid crystal display in the prior art. As shown in FIG. 1, the switching power supply circuit mainly includes a voltage input end, a control IC, a power MOS transistor, a transformer, a rectifier diode and an output capacitor.

Specifically, the MOS transistor is controlled by the control IC, and is turned on or off through a pulse width modulation signal generated by the control IC. When the power MOS transistor is turned on, the inductive current in a primary winding of the transformer starts rising. At this moment, the rectifier diode is turned off due to a secondary winding, and thus energy is stored in the transformer. When the power MOS transistor is turned off, the inductive voltage of the primary winding of the transformer is inverted. At this moment, the rectifier diode is turned on, and the energy in the transformer is supplied to a load through the rectifier diode.

However, in the topological circuit design of the above-mentioned flyback switching power supply circuit, the control IC is used to directly control turn-on and turn-off of the MOS transistor. Due to the parasitic capacitance effect in the transformer, after the MOS transistor is turned off, the drain (D) of the MOS transistor may not be immediately stabilized but tend to be stabilized in manner of damped vibration (as shown in FIG. 2). Since effect from damped vibration is not considered in this process, high switching loss of the MOS transistor is caused.

Accordingly, one of problems dedicated in the field is how to solve the above-mentioned problems, such that the switching loss of the MOS transistor in the flyback switching power supply is reduced.

SUMMARY OF THE INVENTION

One of technical problems to be solved in the present disclosure is to provide a flyback switching power supply circuit, which can effectively reduce the switching loss of an MOS transistor. In addition, the present disclosure also provides a backlight driving device using the circuit.

1) To solve the above-mentioned technical problem, the present disclosure provides a flyback switching power supply circuit, including: a transformer, including a primary winding, a secondary winding and an auxiliary winding arranged on one side of the primary winding; an output rectifier, connected to the output end of the flyback switching power supply circuit from the secondary winding of the transformer; a switching transistor, configured to control the voltage on the primary winding, wherein the drain of the switching transistor is connected to one end of the primary winding; a controller, configured to provide a pulse width modulation signal for driving the gate of the switching transistor, wherein the controller includes a GATE end connected with the gate of the switching transistor; and a clamping delay circuit, configured to clamp the potential of the gate of the switching transistor to low potential, so that the switching transistor is turned on at the wave trough of drain potential damped vibration, wherein the clamping delay circuit is connected to the gate of the switching transistor from the auxiliary winding.

2) In a preferred embodiment of 1) of the present disclosure, the clamping delay circuit further includes:

a voltage stabilizing capacitor, charged according to the voltage generated by the auxiliary winding, wherein the voltage stabilizing capacitor is connected in parallel to the auxiliary winding, and one end of the voltage stabilizing capacitor and the first terminal of the auxiliary winding are connected together to a ground reference;

a diode, connected to the other end of the voltage stabilizing capacitor from the second terminal of the auxiliary winding;

a voltage dividing circuit, configured to divide the voltage stored in the voltage stabilizing capacitor and connected in parallel to the voltage stabilizing capacitor;

a triode, configured to clamp the potential of the gate of the switching transistor to low potential during turn-on, so that the switching transistor is turned on at the wave trough of drain potential damped vibration, wherein the base of the triode is connected to the voltage dividing circuit, and the collector of the triode is connected to the gate of the switching transistor.

3) In a preferred embodiment of 1) or 2) of the present disclosure, the voltage dividing circuit is formed by serially connecting a first voltage dividing resistor with a second voltage dividing resistor, and the base of the triode is connected between the first voltage dividing resistor and the second voltage dividing resistor.

4) In a preferred embodiment of any of 1) to 3) of the present disclosure, when the controller outputs a low potential, the switching transistor is turned off, then the auxiliary winding charges the voltage stabilizing capacitor and turns on the triode through voltage division of the first voltage dividing resistor and the second voltage dividing resistor, and the triode clamps the potential of the gate of the switching transistor to low potential, so that the switching transistor is turned on at the wave trough of drain potential damped vibration.

5) In a preferred embodiment of any of 1) to 4) of the present disclosure, when the controller outputs a high potential, the switching transistor is turned on, and the clamping delay circuit does not work.

6) In a preferred embodiment of any of 1) to 5) of the present disclosure, further included is: a first resistor, connected to the gate of the switching transistor from the GATE end of the controller.

7) In a preferred embodiment of any of 1) to 6) of the present disclosure, further included is: a second resistor, connected to the ground reference from the source of the switching transistor.

8) In a preferred embodiment of any of 1) to 7) of the present disclosure, further included is: an output capacitor, configured to filter the output voltage, wherein one end of the output capacitor is connected with the output end of the flyback switching power supply circuit, and the other end is connected to the ground reference.

9) In a preferred embodiment of any of 1) to 8) of the present disclosure, the output rectifier is a rectifier diode.

10) According to another aspect of the present disclosure, a backlight driving device is also provided, including the above-mentioned flyback switching power supply circuit.

Compared with the prior art, one or more embodiments of the present disclosure may have the following advantages. The clamping delay circuit is arranged in the flyback switching power supply circuit, the auxiliary winding is added into the transformer, the potential of the gate of the MOS transistor is clamped to low potential through the above-mentioned circuit when the MOS transistor is turned on again from turn-off, and the MOS transistor is controlled to be turned on at the wave trough of drain potential damped vibration, so that the accumulated voltage when the MOS transistor is turned on is reduced, a voltage peak is avoided, and the switching loss of the MOS transistor is reduced.

Other features and advantages of the present disclosure will be illustrated in the following description, and become partially apparent from the description or may be understood by implementing the present disclosure. The objectives and other advantages of the present disclosure may be realized and obtained through the structures specified in the description, claims and accompanying drawings.

BRIEF DESCRIPTION OF THE DRAWINGS

The accompanying drawings are provided for further understanding of the present disclosure, constitute a part of the description, and are used for interpreting the present disclosure together with the embodiments of the present disclosure, rather than limiting the present disclosure. In the accompanying drawings.

DETAILED DESCRIPTION OF THE EMBODIMENTS

To make the objectives, technical solutions and advantages of the present disclosure more apparent, the present disclosure will be further illustrated in detail below in conjunction with the accompanying drawings.

Figure 3:
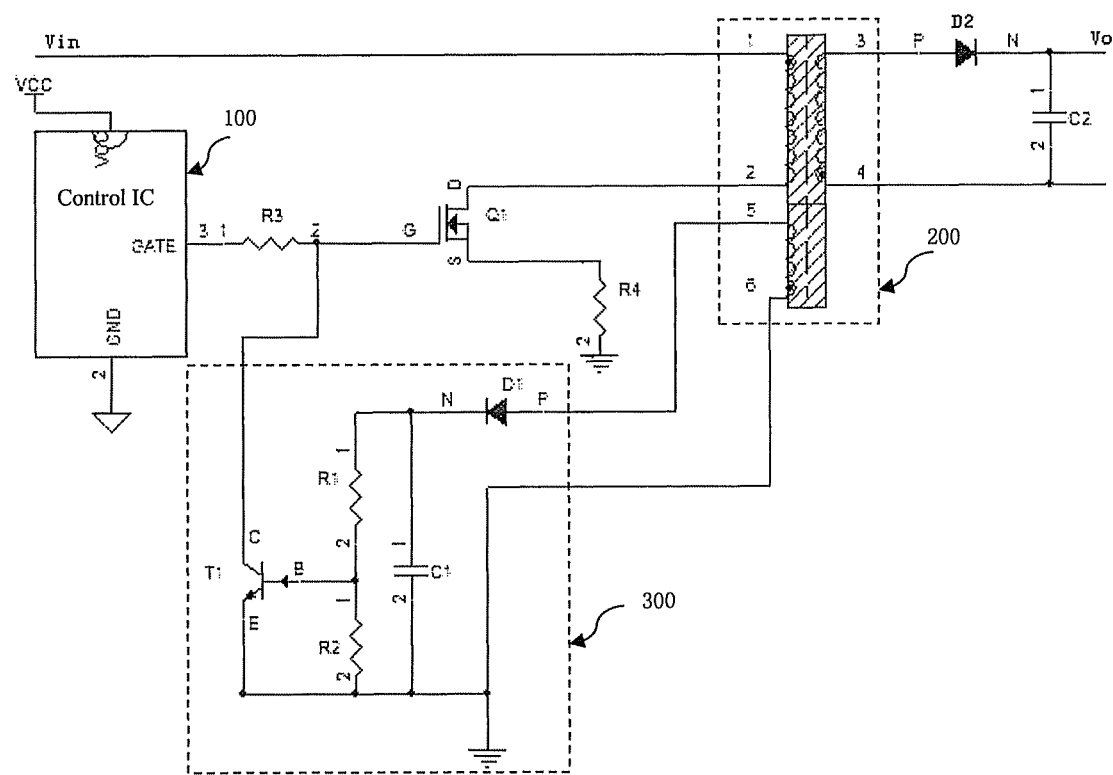
FIG. 3 is a schematic diagram of a flyback switching power supply circuit according to an embodiment of the present disclosure.

Referring to FIG. 3, it shows a flyback switching power supply circuit according to an embodiment of the present disclosure. The flyback switching power supply circuit can reduce the switching loss of a switching transistor through a clamping delay circuit therein, such that the efficiency of the circuit is improved.

As shown in FIG. 3, the flyback switching power supply circuit mainly includes a voltage input end Vin, a transformer 200, a rectifier diode D2, an output capacitor C2, a voltage output end Vo, an N channel field-effect transistor (simply referred to as MOS transistor) Q1, a control IC 100, and a clamping delay circuit 300.

It could be easily understood that FIG. 3 shows an example of a switching transistor formed by the N channel field-effect transistor, and obviously, the switching transistor is not limited to the above equipment.

In this case, the transformer 200 includes a primary winding, a secondary winding and an auxiliary winding arranged on one side of the primary winding. It could be easily understood that turns of the auxiliary winding may be designed according to actual needs of the transformer. According to the principle that the phases of dotted terminals are the same, the auxiliary winding thus acts consistently with the secondary winding, and begins to output a voltage when the MOS transistor Q1 is turned off.

The output diode D2 is connected to the voltage output end Vo of the flyback switching power supply circuit from the secondary winding of the transformer 200. As shown in FIG. 3, the anode of the output diode D2 is connected to the second terminal (terminal 3) of the secondary winding, and the cathode of the output diode D2 is connected to the voltage output end Vo of the flyback switching power supply circuit.

The output capacitor C2 is configured to filter the output voltage, one end of the output capacitor C2 is connected with the output end of the flyback switching power supply circuit, and the other end is connected to a ground reference.

The MOS transistor Q1 is configured to control the voltage on the primary winding of the transformer 200, wherein the drain of the MOS transistor Q1 is connected to the second terminal (terminal 2) of the primary winding. The source of the MOS transistor Q1 is connected to the ground reference through a resistor R4. When a pulse width modulation signal is turned off, a flyback voltage is reflected from the secondary winding to the primary winding and the auxiliary winding.

A VCC of the control IC 100 is configured to provide the pulse width modulation signal for driving the gate of the MOS transistor Q1, wherein the control IC 100 includes a VCC input end for receiving a voltage, a GATE end connected to the gate of the MOS transistor Q1 and a GND ground end connected to the ground reference. When the voltage received by the control IC 100 exceeds a start threshold voltage, the control IC 100 generates a pulse width modulation signal, which is emitted from the GATE end connected with the gate of the MOS transistor Q1. The pulse width modulation signal will drive the gate (G) of the MOS transistor Q1 for pulse width modulation.

The clamping delay circuit 300 is configured to clamp the potential of the gate of the MOS transistor Q1 to low potential, so that the MOS transistor Q1 is turned on at the wave trough of drain potential damped vibration, wherein the clamping delay circuit 300 is connected to the gate of the MOS transistor Q1 from the auxiliary winding. The clamping delay circuit 300 includes a triode T1, a first voltage dividing resistor R1, a second voltage dividing resistor R2, a voltage stabilizing capacitor C1 and a diode D1.

The voltage stabilizing capacitor C1 is charged according to the voltage generated by the auxiliary winding, the voltage stabilizing capacitor C1 is connected in parallel to the auxiliary winding of the transformer 200, and one end of the voltage stabilizing capacitor C1 and the first terminal (terminal 6) of the auxiliary winding are connected together to the ground reference.

The diode D1 is connected to the other end of the voltage stabilizing capacitor C1 from the second terminal (terminal 5) of the auxiliary winding of the transformer 200. As shown in FIG. 3, the anode of the diode D1 is connected to the second terminal of the auxiliary winding of the transformer 200, and the cathode of the diode D1 is connected to one end of the voltage stabilizing capacitor C1. The first voltage dividing resistor R1 and the second voltage dividing resistor R2 are connected in series to form a voltage dividing circuit, and the voltage dividing circuit is connected in parallel to the voltage stabilizing capacitor C1. The voltage dividing circuit is configured to divide the voltage stored in the voltage stabilizing capacitor C1. That is, the voltage stored in the voltage stabilizing capacitor C1 is divided by using the first voltage dividing resistor R1 and the second voltage dividing resistor R2. Certainly, the above-mentioned voltage dividing circuit is merely a preferred example, and the magnitude of the voltage dividing resistance may be reasonably adjusted according to actual conditions by those skilled in the art, so as to achieve the best effect.

The triode T1 is configured to clamp the potential of the gate of the MOS transistor Q1 to low potential during turn-on, so that the MOS transistor Q1 is turned on at the wave trough of damped vibration of the drain thereof. The base of the triode T1 is connected to the voltage dividing circuit (i.e., between the first voltage dividing resistor R1 and the second voltage dividing resistor R2), and the collector of the triode T1 is connected to the gate of the MOS transistor Q1.

In addition, the flyback switching power supply circuit also includes a first resistor R3, which is connected to the gate of the MOS transistor Q1 from the GATE end of the control IC 100 to play a role in limiting current, thus controlling the turn-on and turn-off speed of the MOS transistor Q1. The flyback switching power supply circuit also includes a second resistor R4, which is connected to the ground reference from the source of the MOS transistor Q1 and also plays a role in limiting current in the circuit.

Next, detailed operation of the flyback switching power supply circuit will be illustrated. Referring to FIG. 3, firstly, the control IC 100 detects whether the voltage of the VCC input end thereof exceeds the start threshold voltage, if so, the control IC 100 generates a pulse width modulation signal, and emits the pulse width modulation signal from the GATE end connected with the gate of the MOS transistor Q1.

When the control IC 100 outputs a high potential to the gate of the MOS transistor Q1, the MOS transistor Q1 is turned on. At this moment, the terminal 1 of the primary winding of the transformer 200 is of high potential, the terminal 6 of the auxiliary winding of the transformer 200 is also a high potential terminal, the diode D1 is turned off, and the clamping delay circuit 300 does not work.

Figure 1:
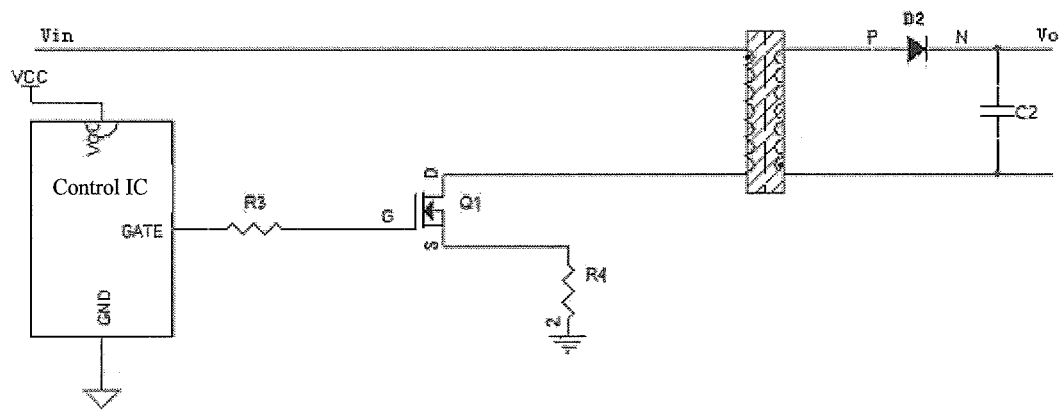
FIG. 1 is a schematic diagram of a flyback switching power supply circuit in the prior art.
Figure 2:
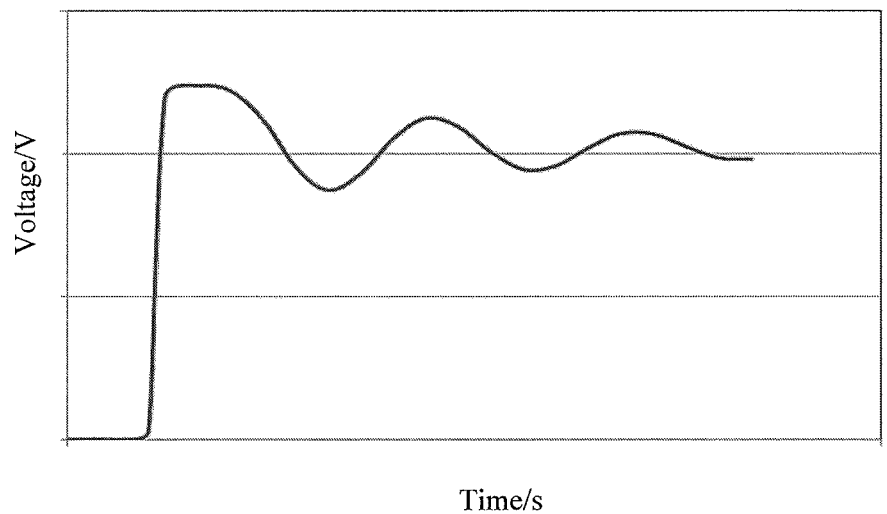
FIG. 2 is a schematic diagram of damped vibration of the drain (D) of an MOS transistor in the flyback switching power supply circuit.

When the control IC 100 outputs a low potential to the gate of the MOS transistor 01, the MOS transistor Q1 is turned off. When the MOS transistor Q1 is turned off, the terminal 1 of the primary winding of the transformer 200 is of low potential, the terminal 5 of the auxiliary winding is a high potential terminal, and the voltage waveform of the MOS transistor Q1 is similar to the damped vibration shown in FIG. 2 likewise. At this moment, the diode D2 is turned on, and the clamping delay circuit 300 starts working.

Specifically, because the magnitudes of the first voltage dividing resistor R1, the second voltage dividing resistor R2 and the voltage stabilizing capacitor C1 are set reasonably, the auxiliary winding of the transformer 200 charges C1, the triode T1 is turned on through voltage division of the first voltage dividing resistor R1 and the second voltage dividing resistor R2, then the gate of the MOS transistor Q1 is clamped to low potential, and the MOS transistor Q1 is controlled to be turned on at the wave trough of drain potential damped vibration.

It is mainly considered that due to the parasitic capacitance effect in the transformer 200, after the MOS transistor Q1 is turned off, the potential of the drain of the MOS transistor Q1 is not immediately stabilized but tends to be stabilized according to the damped vibration. The potential of the gate of the MOS transistor is clamped to low potential through the above-mentioned circuit when the MOS transistor is turned on again from turn-off, and the MOS transistor is controlled to be turned on at the wave trough of damped vibration of drain potential thereof, so that the accumulated voltage when the MOS transistor is turned on is reduced, a voltage peak is avoided, and the switching loss of the MOS transistor is thus reduced. This is because the switching loss is approximately equal to $\Delta V * \Delta/4$, and $\Delta V$ is minimum at the wave trough, so that the switching loss may be reduced.

In addition, the present disclosure also relates to a backlight driving device, including the above-mentioned flyback switching power supply circuit.

In conclusion, the clamping delay circuit is arranged in the flyback switching power supply circuit, and the auxiliary winding is added in the transformer, so that the switching loss of the switching transistor can be reduced by using the clamping delay circuit, and thus the efficiency of the circuit is improved.

The foregoing descriptions are merely preferred specific embodiments of the present disclosure, but the protection scope of the present disclosure is not limited thereto. Readily conceivable variations or substitutions, to any skilled one who is familiar with this art, within the disclosed technical scope of the present disclosure shall be incorporated in the protection scope of the present disclosure. Accordingly, the protection scope of the present disclosure should be subjected to the protection scope of the claims.

What is claimed is:
1. A flyback switching power supply circuit, including:
  a transformer, including a primary winding, a secondary winding, and an auxiliary winding arranged on one side of the primary winding;
  an output rectifier, connected to the output end of the flyback switching power supply circuit from the secondary winding of the transformer;
  a switching transistor, configured to control the voltage on the primary winding, wherein the drain of the switching transistor is connected to one end of the primary winding;
  a controller, configured to provide a pulse width modulation signal for driving the gate of the switching transistor, wherein the controller includes a GATE end connected with the gate of the switching transistor; and
  a clamping delay circuit, configured to clamp the potential of the gate of the switching transistor to low potential, so that the switching transistor is turned on at the wave trough of drain potential damped vibration, wherein the clamping delay circuit is connected to the gate of the switching transistor from the auxiliary winding, wherein the clamping delay circuit comprises:
    a voltage stabilizing capacitor, charged according to the voltage generated by the auxiliary winding, wherein the voltage stabilizing capacitor is connected in parallel to the auxiliary winding, and one end of the voltage stabilizing capacitor and the first terminal of the auxiliary winding are connected together to a ground reference;
    a diode, connected to the other end of the voltage stabilizing capacitor from the second terminal of the auxiliary winding;

a voltage dividing circuit, configured to divide the voltage stored in the voltage stabilizing capacitor and connected in parallel to the voltage stabilizing capacitor; and a triode, configured to clamp the potential of the gate of the switching transistor to low potential during turn-on, so that the switching transistor is turned on at the wave trough of drain potential damped vibration, wherein the base of the triode is connected to the voltage dividing circuit, and the collector of the triode is connected to the gate of the switching transistor.

2. The flyback switching power supply circuit of claim 1, wherein,
the voltage dividing circuit is formed by serially connecting a first voltage dividing resistor with a second voltage dividing resistor, and the base of the triode is connected between the first voltage dividing resistor and the second voltage dividing resistor.

3. The flyback switching power supply circuit of claim 2, wherein,
when the controller outputs a low potential, the switching transistor is turned off, then the auxiliary winding charges the voltage stabilizing capacitor and turns on the triode through voltage division of the first voltage dividing resistor and the second voltage dividing resistor, and the triode clamps the potential of the gate of the switching transistor to low potential, so that the switching transistor is turned on at the wave trough of drain potential damped vibration.

4. The flyback switching power supply circuit of claim 3, wherein,
when the controller outputs a high potential, the switching transistor is turned on, and the clamping delay circuit does not work.

5. The flyback switching power supply circuit of claim 1, wherein further including:
a first resistor, connected to the gate of the switching transistor from the GATE end of the controller.

6. The flyback switching power supply circuit of claim 5, wherein further including:
a second resistor, connected to the ground reference from the source of the switching transistor.

7. The flyback switching power supply circuit of claim 6, wherein further including:
an output capacitor, configured to filter the output voltage, wherein one end of the output capacitor is connected with the output end of the flyback switching power supply circuit, and the other end is connected to the ground reference.

8. The flyback switching power supply circuit of claim 7, wherein the output rectifier is a rectifier diode.

9. A backlight driving device, including a flyback switching power supply circuit,
the flyback switching power supply circuit including:
a transformer, including a primary winding, a secondary winding and an auxiliary winding arranged on one side of the primary winding;
an output rectifier, connected to the output end of the flyback switching power supply circuit from the secondary winding of the transformer;
a switching transistor, configured to control the voltage on the primary winding, wherein the drain of the switching transistor is connected to one end of the primary winding;
a controller, configured to provide a pulse width modulation signal for driving the gate of the switching transistor, wherein the controller includes a GATE end connected with the gate of the switching transistor; and a clamping delay circuit, configured to clamp the potential of the gate of the switching transistor to low potential, so that the switching transistor is turned on at the wave trough of drain potential damped vibration, wherein the clamping delay circuit is connected to the gate of the switching transistor from the auxiliary winding, wherein the clamping delay circuit comprises:
a voltage stabilizing capacitor, charged according to the voltage generated by the auxiliary winding, wherein the voltage stabilizing capacitor is connected in parallel to the auxiliary winding, and one end of the voltage stabilizing capacitor and the first terminal of the auxiliary winding are connected together to a ground reference;
a diode, connected to the other end of the voltage stabilizing capacitor from the second terminal of the auxiliary winding;
a voltage dividing circuit, configured to divide the voltage stored in the voltage stabilizing capacitor and connected in parallel to the voltage stabilizing capacitor;
a triode, configured to clamp the potential of the gate of the switching transistor to low potential during turn-on, so that the switching transistor is turned on at the wave trough of drain potential damped vibration, wherein the base of the triode is connected to the voltage dividing circuit, and the collector of the triode is connected to the gate of the switching transistor.

10. The backlight driving device of claim 9, wherein,
the voltage dividing circuit is formed by serially connecting a first voltage dividing resistor with a second voltage dividing resistor, and the base of the triode is connected between the first voltage dividing resistor and the second voltage dividing resistor.

11. The backlight driving device of claim 10, wherein,
when the controller outputs a low potential, the switching transistor is turned off, then the auxiliary winding charges the voltage stabilizing capacitor and turns on the triode through voltage division of the first voltage dividing resistor and the second voltage dividing resistor, and the triode clamps the potential of the gate of the switching transistor to low potential, so that the switching transistor is turned on at the wave trough of drain potential damped vibration.

12. The backlight driving device of claim 11, wherein,
when the controller outputs a high potential, the switching transistor is turned on, and the clamping delay circuit does not work.

13. The backlight driving device of claim 9, wherein further including:
a first resistor, connected to the gate of the switching transistor from the GATE end of the controller.

14. The backlight driving device of claim 13, wherein further including:
a second resistor, connected to the ground reference from the source of the switching transistor.

15. The backlight driving device of claim 14, wherein further including:
an output capacitor, configured to filter the output voltage, wherein one end of the output capacitor is connected with the output end of the flyback switching power supply circuit, and the other end is connected to the ground reference.

16. The backlight driving device of claim 15, wherein the output rectifier is a rectifier diode.

\* \* \* \* \*